United States Patent [19]
Kakizaki

[11] Patent Number: 5,286,101
[45] Date of Patent: Feb. 15, 1994

[54] ANTI-LOCK/TRACTION MODULATOR FOR BRAKE CONTROL SYSTEM

[75] Inventor: Hideki Kakizaki, Saitama, Japan

[73] Assignee: Akebono Brake Industry Co., Ltd., Tokyo, Japan

[21] Appl. No.: 889,340

[22] Filed: May 28, 1992

[30] Foreign Application Priority Data

May 29, 1991 [JP] Japan .................................. 3-152269

[51] Int. Cl.$^5$ .................................................. B60T 8/64
[52] U.S. Cl. ............................... 303/113.2; 303/11; 303/116.2
[58] Field of Search ............... 303/113.2, 116.1, 116.2, 303/DIG. 3, DIG. 4, 110; 180/197

[56] References Cited

U.S. PATENT DOCUMENTS

| 4,726,630 | 2/1982 | Krohn et al. | 303/111 |
|---|---|---|---|
| 4,750,788 | 6/1988 | Seibert et al. | 303/116.2 |
| 4,796,959 | 1/1989 | Seibert | 180/197 |
| 4,807,943 | 2/1989 | Ogino | 303/113.2 |
| 4,865,397 | 9/1989 | Inoue et al. | 303/113.2 |
| 4,894,555 | 1/1990 | Watanabe | 303/113.2 |
| 5,123,716 | 6/1992 | Willmann | 303/113.2 |

FOREIGN PATENT DOCUMENTS 62-83241 4/1987 Japan .................................. 303/116.2

Primary Examiner—Matthew C. Graham
Attorney, Agent, or Firm—Finnegan, Henderson, Farabow, Garrett & Dunner

[57] ABSTRACT

An anti-lock/traction modulator which includes a hydraulic pressure passage circuit for an anti-skid control and a hydraulic pressure source circuit for a traction control in which an accumulator disposed at an inlet side of a pump for accumulating a predetermined pressure and which circuit supplies a brake pressure to the hydraulic circuit for the anti-skid control merely during the traction control operation. These circuits are connected to each other through a piston so that brake pressure is supplied to brake cylinders of vehicle wheels from the piston during the traction control operation.

6 Claims, 2 Drawing Sheets

ANTI-LOCK/TRACTION MODULATOR FOR BRAKE CONTROL SYSTEM

BACKGROUND OF THE INVENTION

1. Field of the Invention

The present invention relates to an antilock/traction modulator and more specifically to a brake control system for use in a vehicle which applies an appropriate brake force to vehicle wheels to prevent the wheels from slipping when the vehicle starts to move rapidly, and controls the brake force appropriately to prevent the vehicle wheels from skidding when the vehicle brakes.

2. Related Art

Recently, there has actively been developing an anti-lock/traction modulator having functions of an anti-lock control for preventing vehicle wheels from skidding when the vehicle brakes and a traction control for preventing the wheels from excessive slipping when the vehicle starts to move or accelerates rapidly, for a driver to drive a vehicle easily and improve abilities of start, acceleration and driving stability of the vehicle.

An example of the conventional anti-lock/traction modulator of this type is disclosed, for example, in U.S. Pat. Nos. 4,750,788 and 4,726,630.

FIG. 1 is a schematic view of a brake apparatus described in U.S. Pat. No. 4,750,788. A brake apparatus 100 is provided with a master cylinder 102, booster 103, hydraulic pump P, adjusting valve 106, change valves 104, 105 and 108-115, brake cylinders of driving and driven wheels, reservoir tank 107 and oil passages for selectively communicating these devices and valves.

The operation of the brake apparatus 100 is briefly described as follows.

(1) Normal Braking Operation

The condition of the change valves during the normal braking operation is as shown in FIG. 1. When a hydraulic pressure is generated in the master cylinder 102 by depressing a brake pedal, the hydraulic (brake) pressure is supplied to a brake cylinder for each of the vehicle wheels from outlet ports I, II of the cylinder 102 through the change valves 108, 111, 109 and 113.

(2) Anti-skid Control Operation

If the wheels skid during the braking operation, the change valves 104, 108 and 109 are changed from their condition shown in FIG. 1 and, at the same time, the hydraulic pump P is actuated. The brake pressure generated by the hydraulic pump P becomes equal in pressure to the hydraulic pressure generated by the master cylinder 102 owing to the operation of the adjusting valve 106 to which the hydraulic pressure from the master cylinder 102 is applied. Accordingly, the brake pressure generated by the hydraulic pump P becomes ready for being supplied to the wheel cylinders through tee valves 108 and 109. Under this condition, the valves 110 and 111, or 112 and 113 are controlled to open and close to control the brake force to hold, release and apply according to the condition of skid of each of the vehicle wheels, thereby achieving the anti-skid control.

(3) Traction Control Operation

During the traction control operation, the valves 104, 105 108, 109, 114 and 115 are changed from the condition shown in FIG. 1 and, at the same time, the hydraulic pump P is actuated. The brake pressure generated by the hydraulic pump P of an in-line type is supplied to the brake cylinders through valves 108 and 109 to thereby apply the brake force to the vehicle wheels. Under this condition, the valves 110 and 111 or 112 and 113 are controlled to open and close to control the brake force to hold, release and apply according to the condition of the slip of each of the driving wheels, thereby achieving the traction control.

The valves 104, 105 and 108-115 as well as the hydraulic pump P are controlled by a publicly known electronic control device (not shown) in accordance with output signals of wheel speed sensors for detecting the condition of the vehicle wheels (skidding or slipping).

As described above, the skid or slip of the vehicle wheels are appropriately controlled and, therefore, the vehicle can decelerate or stop stably and start to move smoothly.

However, the conventional anti-lock/traction modulator as described above has a disadvantage that if a part of the hydraulic pressure passage circuit for the traction control comes to fail or have a damage the passage circuit for the normal brake operation comes also to deteriorate which raises a serious problem in safety driving since the pressure passage circuit for the traction control communicates with that for the anti-skid control. Further, the TCS pump of an in-line type is required to pump up the brake fluid against the passage resistance generated between the master cylinder and the modulator, thereby lowering the ability of the pump.

SUMMARY OF THE INVENTION

The present invention was made in view of the foregoing difficulties and problem accompanying the conventional anti-lock/traction modulator.

Accordingly, an object of the invention is to provide an anti-lock/traction modulator capable of improving a safety driving by which a normal brake operation and an anti-skid control operation can stably be operated even if a failure or damage is occurred on a passage circuit for a traction control.

Another object of the invention is to provide an anti-lock/traction modulator which can improve an ability of a pump by eliminating an inlet circuit connected to a master cylinder so that a pump-up resistance is sufficiently suppressed.

The above and other objects can be achieved by a provision of an anti-lock/traction modulator which, according to the present invention, includes a hydraulic pressure passage circuit for an anti-skid control and a hydraulic pressure source circuit for a traction control in which an accumulator disposed at an inlet side of a pump for accumulating a predetermined pressure, and which circuit supplies a brake pressure to the hydraulic circuit for anti-skid control merely during the traction control operation. These circuits are connected to each other through a piston so that brake pressure is supplied to brake cylinders of vehicle wheels from the piston during the traction control operation.

When a control signal representing a driving slippage is produced by an electronic control device, a cut valve is actuated to shut a fluid communication between a master cylinder and a hold valve and also a change valve is actuated to shut a fluid communication between a compression piston and an accumulator. At the same time, a TCS pump starts to pump-up brake fluid from the accumulator. The brake fluid thus pumped-up is supplied to a compression piston chamber to urge a compression piston to move against an elastic force of a compression spring. When the compression piston is urged to move, the brake fluid contained in the compression piston is supplied to the brake cylinders through the hold valve, so that the driving wheels brake and the undesired slip is suppressed. Further, under the traction control operation, a pump for anti-skid control, hold valve and decay valve are controlled by the electronic control device to control the brake force to hold release and apply according to the slipping condition of each of the driving wheels.

DESCRIPTION OF THE PREFERRED EMBODIMENT

A preferred embodiment of the present invention will now be described with referenced to FIG. 2.

Figure 1:
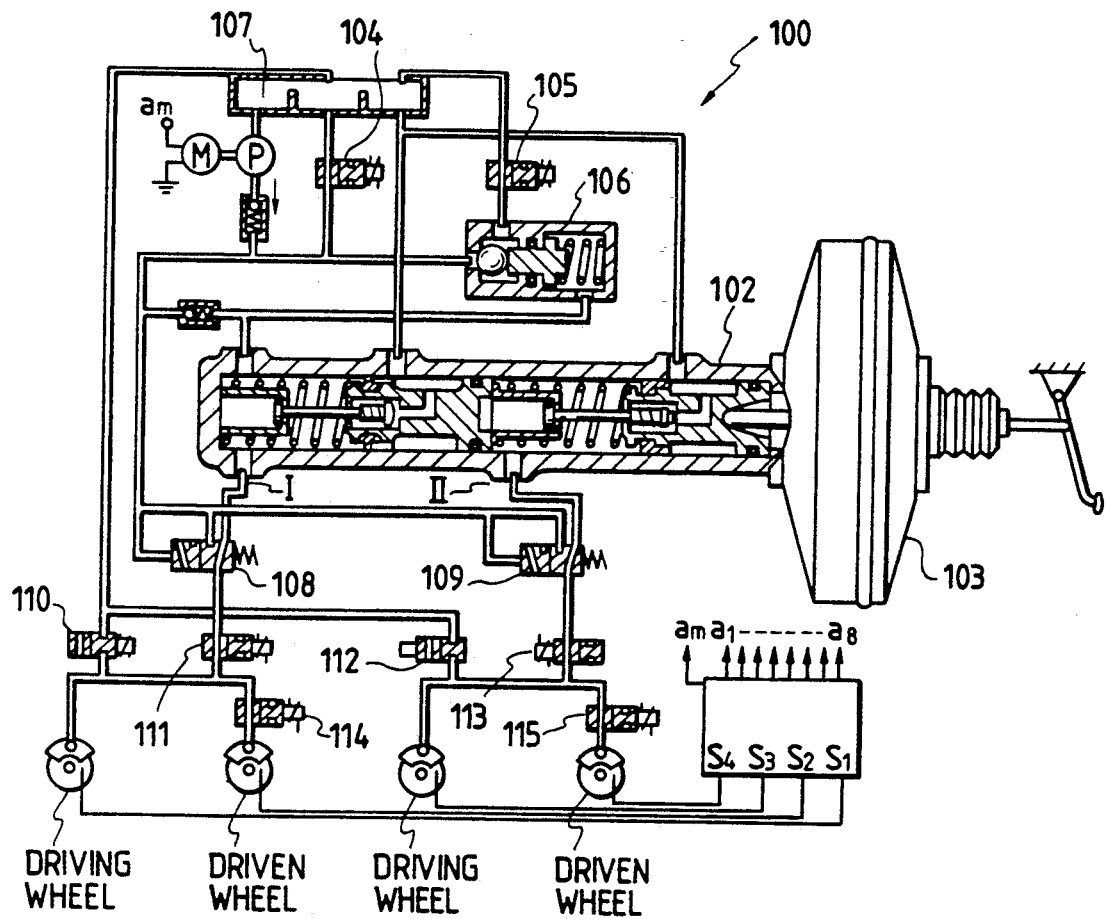
FIG. 1 is a schematic view showing a conventional anti-lock/traction modulator apparatus.
Figure 2:
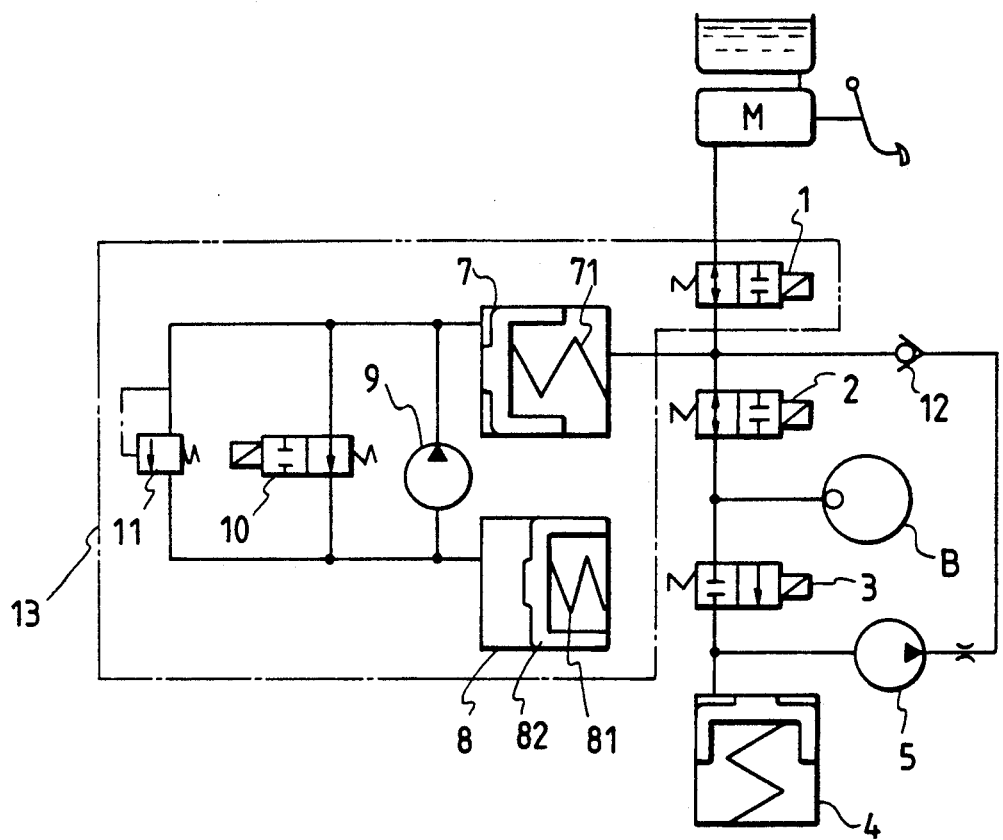
FIG. 2 is a schematic view showing an anti-lock/traction modulator system according to the present invention.

FIG. 2 is a schematic view showing one example of an anti-lock/traction modulator of the present invention applied to a fluid pressure passage circuit for one of driving wheels of a vehicle. Another modulator having the same function is applied to the other driving wheels. Every valve disposed in the modulator are controlled by a known electronic control device (not shown).

A master cylinder M, cut valve 1, hold valve 2, decay valve 3 and reservoir 4 are connected in series to each other for each of the driving wheels of the vehicle. A wheel cylinder of a brake B for the driving wheel is connected to a fluid passage connecting between the hold valve 2 and decay valve 3. As shown in FIG. 2, a fluid pressure pump 5 for anti-skid control is provided with an inlet port connected between the decay valve 3 and reservoir 4 and an outlet port connected to a fluid passage between the cut valve 1 and hold valve 2 through a non-return valve 12.

A compression piston 7 constituting a TCS unit 13 described hereinafter is connected also to the passage between the cut valve 1 and hold valve 2. The TCS unit 13 is constituted by the compression piston 7, a relief valve 11, accumulator 8, a TCS pump 9 and a change valve 10. The compression piston 7, TCS pump 9 and accumulator 8 are connected in series to each other, whereas the TCS pump 9, change valve 10 and the relief valve 11 are connected in parallel with each other. The compression piston 7 is provided with a cylinder chamber divided into two chambers and supplies brake fluid to the fluid pressure passage circuit for anti-skid control by an operation of the fluid pressure generated by the TCS pump 9 during the traction control operation. One chamber of the compression piston 7 connects to an outlet port of the TCS pump through a fluid passage while the other chamber of which connects to the passage between the cut valve 1 and hold valve 2 of the fluid pressure passage circuit for anti-skid control. A compression spring 71 is disposed in the other chamber of the compression piston 7 to always urge the compression piston 7 leftwardly of FIG. 2. The accumulator 8 is provided with a piston 82 and an accumulator spring 81 disposed therein for urging the piston 82 leftwardly of FIG. 2, and accumulates the brake fluid contained in the compression piston 7 not during the traction control operation.

The compression spring 71 of the compression piston 7 has a spring modulus which is larger than that of the accumulator spring 81 of the accumulator 8. Accordingly, not during the traction control operation, the compression piston 7 is urged toward leftside of FIG. 2 by an elastic force of the compression spring 71 whereas the accumulator piston 82 is urged toward rightside of FIG. 2 against an elastic force of the spring 81 by the brake fluid pressure applied by the compression piston 7. In this condition, one chamber of the compression piston 7 at the accumulator side on the other hand communicates with the fluid passage circuit for anti-skid control, and the chamber is filled with brake fluid.

The TCS pump 9 generates a fluid pressure by changing the change valve 10 to close during the traction control operation. On the other hand, the TCS pump 9 is actuated in association with the fluid pressure pump 5 for anti-skid control so that the brake fluid flows circulatedly from the accumulator 8 through TCS pump 9 and change valve 10 and back to the accumulator 8 by holding the change valve 10 to open. Accordingly, no pressure increase of the fluid is occurred in this condition.

The operation of the modulator system described above will now be described.

(1) Normal Brake Control Operation

The condition of the valves is as shown in FIG. 2. The master cylinder M generates a fluid (brake) pressure when a brake pedal is depressed. The brake pressure generated by the master cylinder M is supplied from the outlet port thereof to the brake cylinder of a brake B for the vehicle wheel through the cut valve 1, hold valve 2, so that the brake operation is obtained.

(2) Anti-Skid Control Operation

The master cylinder M produces a hydraulic pressure when the brake pedal is depressed to brake the vehicle. The brake pressure generated by the master cylinder M is supplied from the outlet port thereof to the brake cylinder of the brake B for the wheel through the cut valve 1, hold valve 2, so that the brake operation is actuated.

During the braking operation, if a skid of the wheel is detected by a wheel speed sensor (not shown), an electronic control circuit (not shown) controls the hold valve 2, decay valve 3 and fluid pressure pump 5 for anti-skid control in accordance with the condition of the skid of the wheel. Supposing now the electronic control device outputs a signal representing "a brake-hold control", the hold valve 2 is closed to shut a fluid communication between the master cylinder M and the wheel cylinder to hold the brake pressure applied to the wheel cylinder. Next, when the electronic control device outputs a signal representing "a brake-release control", the hold valve 2 is closed to shut the fluid communication between the master cylinder M and the wheel cylinder and, at the same time, the decay valve 3 opens to allow the brake fluid in the wheel cylinder to discharge into the reservoir 4 through a passage connecting between the wheel cylinder and the reservoir 4 to thereby release the brake force. The brake fluid supplied to the reservoir 4 is circulated back to the master cylinder M by the fluid pressure pump 5 for anti-skid control which is actuated at the same time when the fluid pressure control is operated. The fluid pressure control as described above is carried out independently in each of the wheel cylinders of the vehicle.

(3) Traction Control Operation

When the vehicle starts to move rapidly, if the driving wheel slips because of a large torque exceeding a predetermined value, the slip is detected by the wheel speed sensor (not shown in the figure) which outputs a slip signal to the known electronic control device (not shown).

The electronic control device controls the hold valve 2, decay valve 3 and the fluid pressure pump 5 for anti-skid control in accordance with the condition of the slip of the vehicle wheels. Supposing now the electronic control device outputs a control signal representing a slip of driving wheel, the cut valve 1 closes to shut a fluid communication between the master cylinder M and the hold valve 2 and at the same time the change valve 10 closes to shut a fluid communication between the compression piston 7 and the accumulator 8. Further, the TCS pump 9 starts to pump-up the brake fluid from the accumulator 8. In this operation, since the accumulator 8 itself generates a pressure (1–10 Kg/cm$^2$, for example) by an elastic force of the accumulator spring 81, the brake fluid contained in the accumulator 8 is rather compressed into the pump chamber of the TCS pump 9, so that the ability of the pump 9 is effectively improved.

The brake fluid pumped up by the TCS pump 9 is supplied to the compression piston chamber of the compression piston 7 to urge the compression piston 7 rightwardly of FIG. 2 against the elastic force of the compression spring 71. When the rightward movement of the compression piston 7 causes the brake fluid in the compression piston 7 to supply into the wheel cylinder of the brake B through the hold valve 2, so that the driving wheel brakes to thereby suppress the driving slippage. During the traction control operation, the fluid pressure pump 5 for anti-skid control, hold valve 2 and the decay valve 3 are also controlled by the electronic control device to control the brake force to hold, release and apply in accordance with the condition of the slip of the driving wheel.

Actually, when the brake force is to be held, the hold valve 2 and the decay valve 3 are controlled to close to hold the brake force (fluid pressure pump 5 for anti-skid is not actuated). On the other hand, when the brake force is to be released, the decay valve 3 is controlled to open to allow the brake fluid in the brake cylinder to discharge into the reservoir 4 and, at the same time, the fluid pressure pump 5 for anti-skid starts to pump-up the brake fluid. The brake fluid discharged from the fluid pressure pump 5 for anti-skid control is circulated to flow into the compression piston 7. Then the compression piston 7 is urged to move leftwardly in FIG. 2 so that the brake fluid in the compression piston is flown in the accumulator 8 through the relief valve 11. As a result, the brake pressure applied to the brake cylinder decreases to release the brake force. In this condition, the TCS pump 9 is still actuated, however, the brake fluid supplied from the TCS pump 9 is circulated through the relief valve 11.

The driving slippage is appropriately controlled. When the driving slippage is sufficiently suppressed, the electronic control device detects such a condition and controls the TCS pump 9 to stop and the cut valve 1 to be in a condition shown in FIG. 2.

As described above, according to the present invention, since the fluid pressure passage circuit for anti-skid control and the fluid pressure circuit for traction control are systemized independently, the normal brake control and the anti-skid control operations can stably be operated even if a failure or damage is occurred on the fluid passage circuit for the traction control.

What is claimed is:

1. An anti-lock/traction modulator for a vehicle brake system having a master cylinder and a wheel cylinder for a vehicle wheel, comprising:
   first fluid pressure passage circuit means for supplying a brake fluid from the master cylinder to the wheel cylinder, said first fluid pressure passage circuit means comprising a reservoir and a first pump for pumping the brake fluid to the master cylinder, said first fluid pressure passage circuit means being actuated when the vehicle wheel skids; and
   second fluid pressure passage circuit means having an accumulating means for supplying a brake fluid to the wheel cylinder, said second fluid pressure passage circuit means comprising a piston means connected to the wheel cylinder and a second pump having an inlet side connected at the inlet side to said accumulating means for urging said piston means, said second fluid pressure passage circuit means being connected to said first fluid pressure passage circuit means by a passage extending from said piston means to a portion of said first fluid pressure passage circuit means, said second fluid pressure passage circuit means being actuated when the wheel slips, said second fluid pressure passage circuit means being actuatable independently from said first fluid pressure passage circuit means.

2. The anti-lock/traction modulator of claim 1, wherein said accumulating means comprises an accumulating piston and an accumulating spring for urging said accumulating piston, and said piston means comprises a compression piston and a compression spring for urging said compression piston, said compression spring has a spring modulus larger than that of said accumulating spring.

3. The anti-lock/traction modulator of claim 2, wherein said accumulating means supplies the fluid pressure to said second pump by an elastic force of said accumulating spring.

4. An anti-lock/traction modulator for a vehicle brake system having a master cylinder and a wheel cylinder for a vehicle wheel, comprising:
   a first fluid passage communicating from the master cylinder to the wheel cylinder;
   a reservoir;
   a second fluid passage communicating from the wheel cylinder to said reservoir;
   a third fluid passage communicating from said reservoir to the master cylinder;
   an accumulator;
   a compressed piston means;
   a fourth fluid passage communicating from said accumulator to said compression piston means;
   a fifth fluid passage communicating from said compression piston means to the wheel cylinder;
   a cut valve disposed in said first fluid passage;
   a hold valve disposed in said first fluid passage downstream of said cut valve;
   a decay valve disposed in said second fluid passage;
   a first pump disposed in said third fluid passage;
   a non-return valve disposed in said third fluid passage downstream of said first pump; and
   a second pump disposed in said fourth fluid passage for urging said compression piston means;

wherein the master cylinder, said cut valve, said hold valve, said decay valve and said reservoir are connected in series, and said piston means, said second pump and said accumulator are connected in series, said accumulator being connected to an inlet side of said second pump.

5. The anti-lock/traction modulator of claim 4, further comprising a change valve and a relief valve both connected in parallel with said second pump.

6. The anti-lock/traction modulator of claim 4, wherein said accumulator comprises an accumulating piston and an accumulating spring for urging said accumulating piston, and said compression piston means comprises a compression piston and a compression spring for urging said compression piston, said compression spring has a spring modulus which is larger than that of said accumulating spring.

* * * * *